(12) United States Patent
Amador

(10) Patent No.: US 8,909,949 B2
(45) Date of Patent: Dec. 9, 2014

(54) METHOD AND DEVICE FOR DECODING DATA

(75) Inventor: Erick Amador, Heredia (CR)

(73) Assignee: Intel Mobile Communications GmbH, Neubiberg (DE)

( * ) Notice: Subject to any disclaimer, the term of this patent is extended or adjusted under 35 U.S.C. 154(b) by 408 days.

(21) Appl. No.: 12/961,645

(22) Filed: Dec. 7, 2010

(65) Prior Publication Data

US 2012/0144211 A1 Jun. 7, 2012

(51) Int. Cl.
*G06F 1/26* (2006.01)
*G06F 1/32* (2006.01)
*H04L 1/00* (2006.01)

(52) U.S. Cl.
CPC .............. *G06F 1/3228* (2013.01); *H04L 1/005* (2013.01); *H04L 1/0052* (2013.01)
USPC ........... 713/300; 713/320; 713/323; 713/324; 455/522; 455/572; 455/574

(58) Field of Classification Search
USPC .......... 713/300, 320, 323, 324; 455/522, 572, 455/574
See application file for complete search history.

(56) References Cited

U.S. PATENT DOCUMENTS 4,606,076 A * 8/1986 Davis .......................... 455/343.2
2007/0113149 A1 5/2007 Krafft et al.

OTHER PUBLICATIONS

Claude Berrou, et al., "Near Shannon Limit Error-Correcting Coding and Decoding: Turbo-Codes (1)", IEEE, 1993, p. 1064-1070.
Rose Y. Shao, "Two Simple Stopping Criteria for Turbo Decoding", IEEE, 1999, p. 1117-1120.
A. Matache, et al., "Stopping Rules for Turbo Decoders", TMO Progress Report 42-142, Aug. 15, 2000, p. 1-22.
Wonyoung Kim, et al., "System Level Analysis of Feast, Per-Core DVFS using On-Chip Switching Regulators", IEEE, 2008, p. 123-134.
Erick Amador, et al., "Dynamic Power Management on LDPC Decoders", IEEE, 2010, p. 416-421.
36PP TS 36.300 V10.1.0 (2010-2009).

* cited by examiner

*Primary Examiner* — Michael J Brown
(74) *Attorney, Agent, or Firm* — Eschweiler & Associates, LLC

(57) ABSTRACT

A method comprises predicting a workload required for decoding a code block using a turbo decoder and selecting a power mode of the turbo decoder, the selection of the power mode depending on the prediction of the workload.

30 Claims, 9 Drawing Sheets

METHOD AND DEVICE FOR DECODING DATA

BACKGROUND

The invention relates to a method and a device for decoding data. In particular, the invention relates to reducing an energy consumption of such a device.

Decoders may implement an iterative decoding scheme for decoding data blocks encoded by a forward error correction code. The average power consumption of a decoder increases with the number of iterations required to converge a data block towards an acceptable number of errors.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
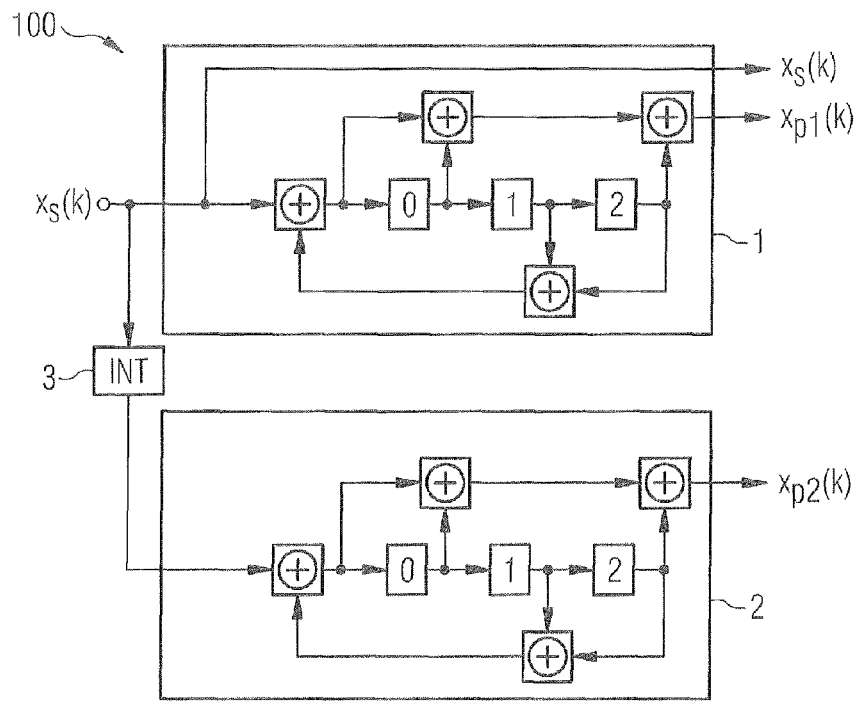
FIG. 1 schematically illustrates a turbo coder 100.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

In addition, while a particular feature or aspect of an embodiment may be disclosed with respect to only one of several implementations, such feature or aspect may be combined with one or more other features or aspects of the other implementations as may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

In the following, reference is made to turbo codes which have been developed for various wireless communications systems. Turbo coding may be utilized to correct errors in the case of a communication over an Additive White Gaussian Noise (AWGN) channel and a Rayleigh fading channel. For example, the wireless communications systems employing turbo codes may be based on the Universal Mobile Telecommunications System (UMTS) standard, e.g. High Speed Downlink Packet Access (HSDPA) or High Speed Uplink Packet Access (HSUPA), and Long Term Evolution (LTE). The methods and devices described herein may thus be used in devices of wireless communication systems, in particular in receivers and transceivers. For example, the methods and devices may be employed in base stations and mobile stations. An exemplary embodiment of a turbo coder and a turbo decoder is described in FIGS. 1 and 2, respectively.

FIG. 1 schematically illustrates a turbo coder 100 which may, for example, be based on the UMTS-3GPP Standard and includes two recursive systematic convolution coders 1 and 2 which may also be referred to as Recursive Systematic Convolutional (RSC) coders. In this case, the systematic output of the second RSC coder 2 which loops through the input signal of the RSC coder 2 is not used and is therefore not shown. The first RSC coder 1 receives an input bit sequence $x_s(k)$ in a direct manner while an interleaver 3 is connected upstream on the input side of the second RSC coder 2 and carries out block-by-block interleaving of the input bit sequence $x_s(k)$. Each RSC coder 1 and 2 uses a shift register with feedback to generate redundant information items $x_{p1}(k)$ and $x_{p2}(k)$, respectively. The resulting coded data sequence is produced by linking two code components, with the first code component including the systematic information $x_s(k)$ and the redundant information $x_{p1}(k)$ of the first RSC coder 1, and the second code component including the redundant information $x_{p2}(k)$ of the second RSC coder 2. The code components are linked by means of a multiplexer (not illustrated) which assembles the individual bit streams $x_s(k)$, $x_{p1}(k)$ and $x_{p2}(k)$ in a suitable manner to form a resultant data sequence. A puncturer (not illustrated) which masks out a part of the redundant information $x_{p1}(k)$ and $x_{p2}(k)$ in the coded data sequence is usually provided in order to produce a higher code rate $R_C$ than ⅓, for example a code rate of $R_C=½$, i.e. two bits of the coded data sequence are associated with one bit of the input sequence $x_s(k)$.

Figure 2:
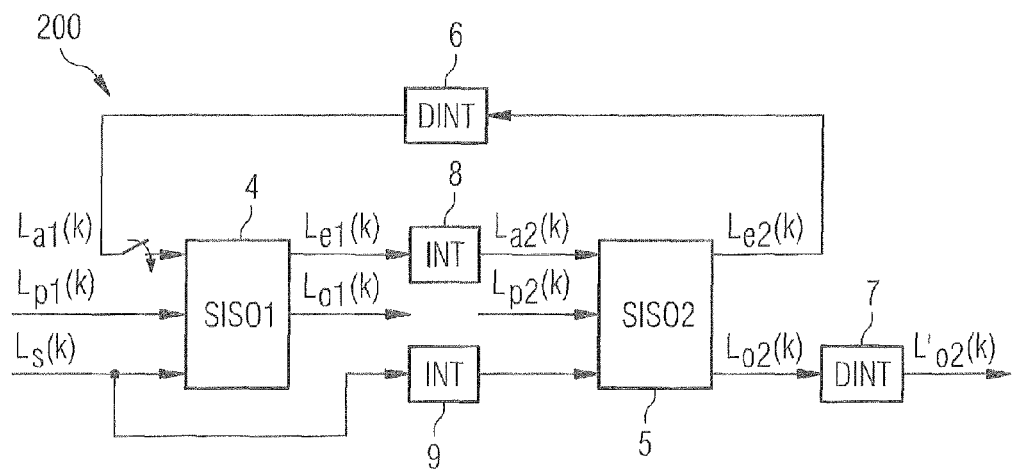
FIG. 2 schematically illustrates a turbo decoder 200.

FIG. 2 illustrates a turbo decoder 200 as it may be used in a mobile radio receiver. Similar to the turbo coder 100 of FIG. 1, the turbo decoder 200 uses two decoder elements 4 and 5 to process the two code components. For example, the decoders 4 and 5 may be embodied as Soft-In-Soft-Out (SISO) decoders. The input and output signals of SISO decoders do not correspond to binary-decision signals, but are digital signals with an appropriate amplitude resolution. SISO decoders may operate using the Maximum A-Posteriori (MAP) algorithm or the Soft Output Viterbi Algorithm (SOVA). The input and output variables may be, in particular, variables based on a Log-Likelihood Ratio (LLR) representation. An LLR variable is a probability statement and is defined as the logarithm of the ratio between the probability of a logic 0 and the probability of a logic 1 (alternatively, the LLR variable is also frequently defined as the logarithm of the ratio between the probability of a logic 1 and the probability of a logic 0). LLR values with positive mathematical signs provide the possibility to deduce the presence of a logic 0 while LLR values with negative mathematical signs indicate the presence of a logic 1. The magnitude of the LLR value in this case indicates the reliability of the hypothesis of a logic 1 or a logic 0. The greater the magnitude of the LLR value, the more reliable is the hypothesis of a logic 1 or a logic 0.

The turbo decoder 200 receives three sequences $L_s(k)$, $L_{p1}(k)$ and $L_{p2}(k)$ of LLR values corresponding to the transmitted sequence elements $x_s(k)$, $x_{p1}(k)$ and $x_{p2}(k)$. The bits $x_s(k)$ and the sequence $L_s(k)$ may be referred to as systematic bits and systematic LLR values, respectively. Based on the received LLR sequences $L_s(k)$ and $L_{p1}(k)$ or $L_{p2}(k)$ and on the a-priori LLR values $L_{a1}(k)$ and $L_{a2}(k)$ generated during the final decoding element, each of the decoder elements 4 and 5 produces two output signals: LLR values $L_{o1}(k)$ and $L_{o2}(k)$ of so-called a-posteriori information and LLR values $L_{e1}(k)$ and $L_{e2}(k)$ of so-called extrinsic information. The a-posteriori LLR values $L_{o1}(k)$ and $L_{o2}(k)$ in this case respectively correspond to the uncoded data sequence $x_s(k)$ (see FIG. 1), wherein the mathematical sign of the a-posteriori values $L_{o1}(k)$ or $L_{o2}(k)$ may be used to deduce the binary data sequence $x_s(k)$. This procedure may be described by the expression "hard decision". The a-posteriori LLR values $L_{o1}(k)$ and $L_{o2}(k)$ may be referred to as soft output values of the respective decoder element 4 or 5. The extrinsic information $L_{e1}(k)$ or $L_{e2}(k)$ corresponds to additional information obtained during the respective decoding element and may be used as a-priori information $L_{a2}(k)$ and $L_{a1}(k)$, respectively, during the subsequent decoding element. In addition, the respective extrinsic information $L_{e1}(k)$ and $L_{e2}(k)$ describes the convergence of the decoding process.

The following relationship applies to the a-posteriori information $L_{o1}(k)$ and $L_{o2}(k)$:

$$L_{o1}(k)=L_s(k)+L_{a1}(k)+L_{e1}(k) \quad (1)$$

$$L_{o2}(k)=L_s(k)+L_{a2}(k)+L_{e2}(k). \quad (2)$$

Since an interleaver 3 (see FIG. 1) is provided in the turbo coder 100, two deinterleavers 6 and 7 as well as two interleavers 8 and 9 are used in a turbo decoding process executed by the decoder 200.

The turbo decoding is carried out iteratively. In this case, the extrinsic values $L_{e2}(k)$ of the decoder element 5 during an iteration i are fed back to the SISO decoder element 4 as a-priori values $L_{a1}(k)$ for the subsequent iteration i+1. Here, the term "half iteration" may correspond to one decoding element. At the start of the decoding process, the a-priori values $L_{a1}(k)$ are set to 0, since there is an equal probability of the transmission of a logic 0 or a logic 1. During the last iteration, the a-posteriori values $L_{o2}(k)$ of the second decoder element 5 are introduced by means of the deinterleaver 7 into the originally transmitted bit sequence, resulting in the LLR values $L'_{o2}(k)$. A hard decision based on these values $L'_{o2}(k)$ results in the uncoded transmission-end data sequence $x_d(k)$ (see FIG. 1).

Provided that the decoding process has not yet converged, the reliability of the a-posteriori information $L_{o1}(k)$ and $L_{o2}(k)$ typically increases in each iteration, that is to say the magnitude of the LLR values $L_{o1}(k)$ and $L_{o2}(k)$ becomes greater. If the decoding process has already converged, further iterations, for example when using a fixed predetermined number of iterations for decoding, merely result in additional computation effort without increasing the reliability of the decoding. Further, if a decoding process has already converged, usually no changes in the hard decisions are observed during subsequent iterations.

The decoding process may be terminated if a certain termination condition or stopping criterion is met. A termination condition may be based on checking information obtained during the decoding process, that is to say typically on the a-posteriori information $L_{o1}(k)$ or $L_{o2}(k)$, respectively, the extrinsic information $L_{e1}(k)$ or $L_{e2}(k)$, respectively, or the a-priori information $L_{a1}(k)$ or $L_{a2}(k)$, respectively, with these information items also being referred to as decoding parameters. The termination criteria may be subdivided into two types: so-called hard-decision-based termination criteria and so-called soft-decision-based termination criteria.

Figure 3:
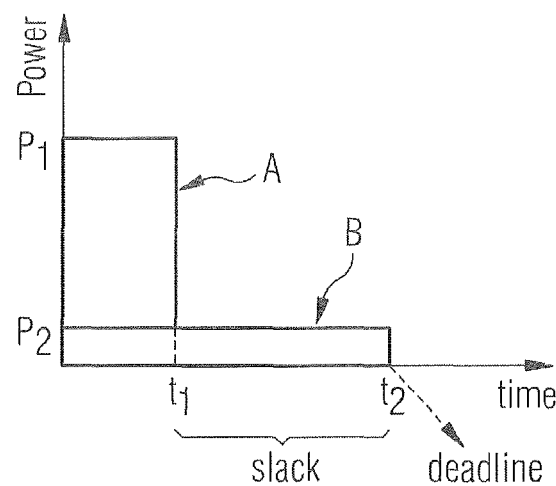
FIG. 3 schematically illustrates the performance of a decoder operating in two different power modes.

FIG. 3 schematically illustrates the performance of an iterative decoder, in particular a turbo decoder, operating in two different power modes. Here, the required power during the decoding task is plotted against the time. A first graph A illustrates a decoding of a code block using the decoder in a power mode of a power $P_1$ while a second graph B illustrates a decoding of the same code block by using the decoder in a power mode of a power $P_2$. The value of the power $P_2$ is smaller than the value of the power $P_1$ such that the power modes of power $P_1$ and $P_2$ may be referred to as high-power mode and a low-power mode, respectively. Operating in the high-power mode, the decoding is completed at a time $t_1$. On the other hand, if the low-power-mode is employed, the decoding is completed at a later time $t_2$. Usually an iterative decoder operates on a higher power mode such that a decoding task is completed before a timing deadline. In FIG. 3, the time $t_2$ may correspond to such a predetermined timing deadline for completing the decoding task. Since a decoder operating in the high power mode thus finishes the decoding task before the timing deadline, the difference between the times $t_2$ and $t_1$ may be referred to as a "slack", because the decoder may idle during the time between the completion of the decoding task and the timing deadline.

The areas under the graphs A and B indicate the total energy required to complete the decoding process using the two power modes, respectively. Depending on the relationship between the power and characteristic variables of the employed decoder, the areas under the two graphs A and B do not necessarily need to coincide. For example, the power may depend on a voltage and/or a frequency required for operating the decoder. Considering the power P being proportional to a frequency f (i.e. P~f) and proportional to the square of a voltage V (i.e. P~$V^2$), the area under the graph B may be smaller than the area under the graph A. Hence, for this case, energy may be saved by at least partly operating the decoder in the low power mode.

Figure 4:
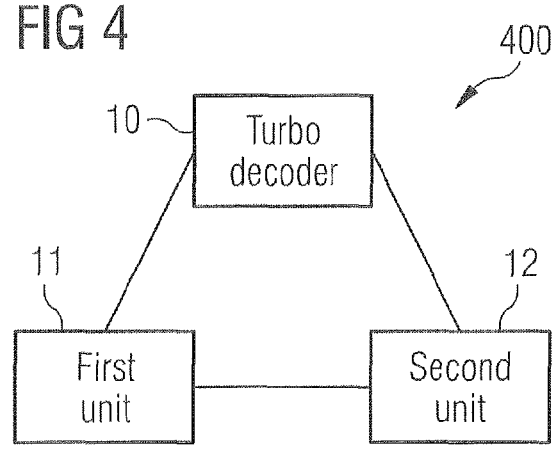
FIG. 4 schematically illustrates a device 400 as an exemplary embodiment.

FIG. 4 schematically illustrates a device 400 as an exemplary embodiment. The device 400 includes a turbo decoder 10, a first unit 11 to predict a workload required for decoding a code block using the turbo decoder 10 and a second unit 12 to select a power mode of the turbo decoder 10. The selection of the power mode depends on the prediction of the workload.

Figure 7:
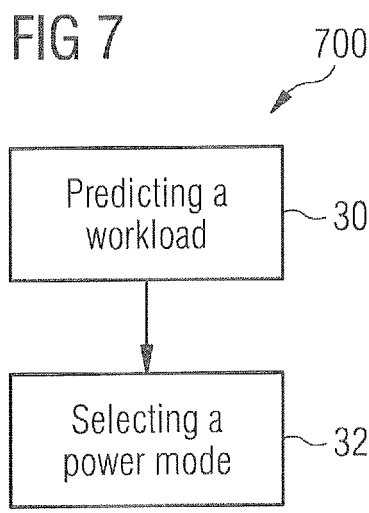
FIG. 7 schematically illustrates a method 700 as an exemplary embodiment.

It is understood that the device 400 may include further components which are not illustrated in FIG. 4 for the sake of simplicity. For example, the turbo decoder 10 may include one or more components that have already been described in connection with FIG. 2. Further, each of the first unit 11 and the second unit 12 may include further components as well. For example, the first unit 11 may include a digital signal processor to perform calculations required for predicting the workload. A method for operating the device 400 is illustrated in FIG. 7.

The power mode of the decoder 10 selected by the second unit 12 may have a power which is smaller than the power of the power mode that has been used before the selected power mode. As already described in connection with FIG. 3, the selection of the power mode may reduce the total energy consumption of the device 400 required to complete a decoding task. In particular, the usage of several power modes may result in obtaining high energy savings for the case of code blocks that reach convergence relatively fast, that is well before a timing deadline.

Figure 5:
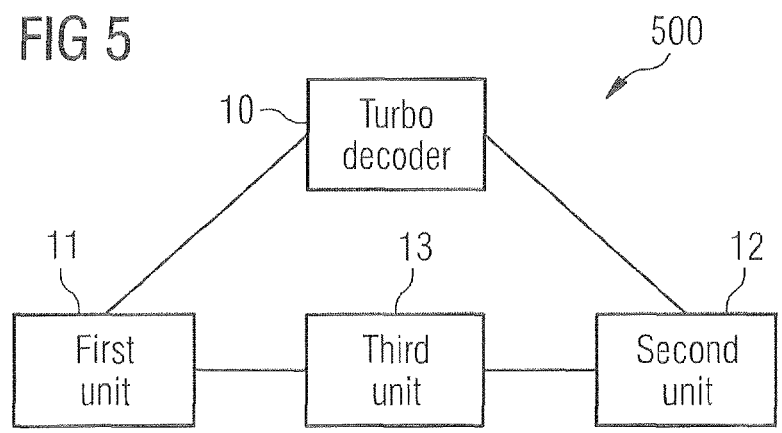
FIG. 5 schematically illustrates a device 500 as a further exemplary embodiment.
Figure 8:
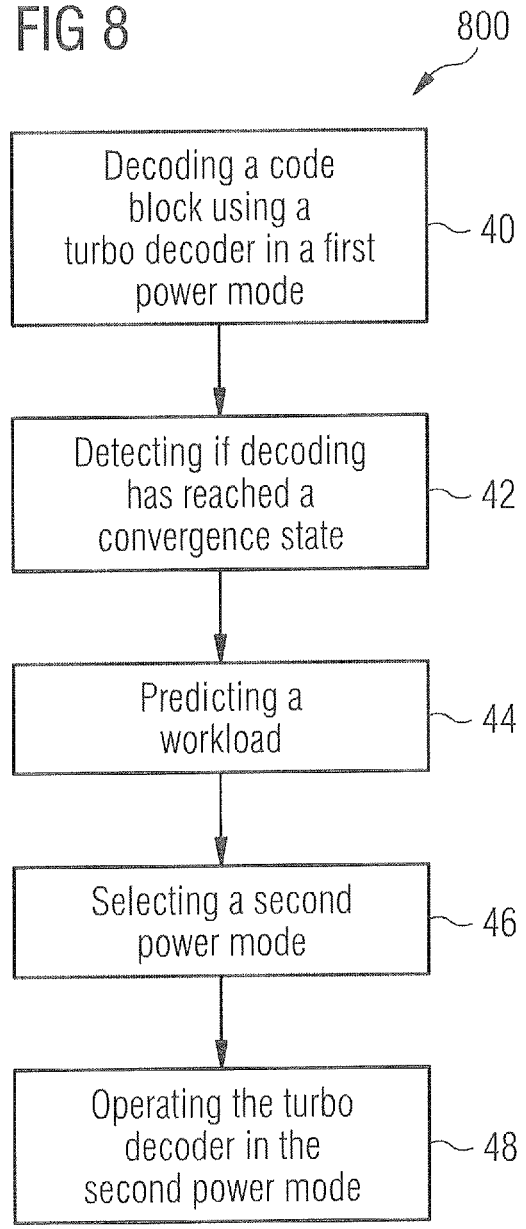
FIG. 8 schematically illustrates a method 800 as a further exemplary embodiment.

FIG. 5 schematically illustrates a device 500 as a further exemplary embodiment. The device 500 includes components 10, 11 and 12 similar to components of FIG. 4 having like reference numerals. The device 500 further includes a third unit 13 to detect if a decoding has reached a convergence state. Note that the term "convergence state" will be specified more clearly in connection with FIG. 9. Again, it is understood that the device 500 may include further components which are not illustrated for the sake of simplicity. Similar to the device 400, a selection of a power mode of the turbo decoder 10 may result in a decrease of the total energy required to complete a decoding task. A method for operating the device 500 is illustrated in FIG. 8.

Figure 6:
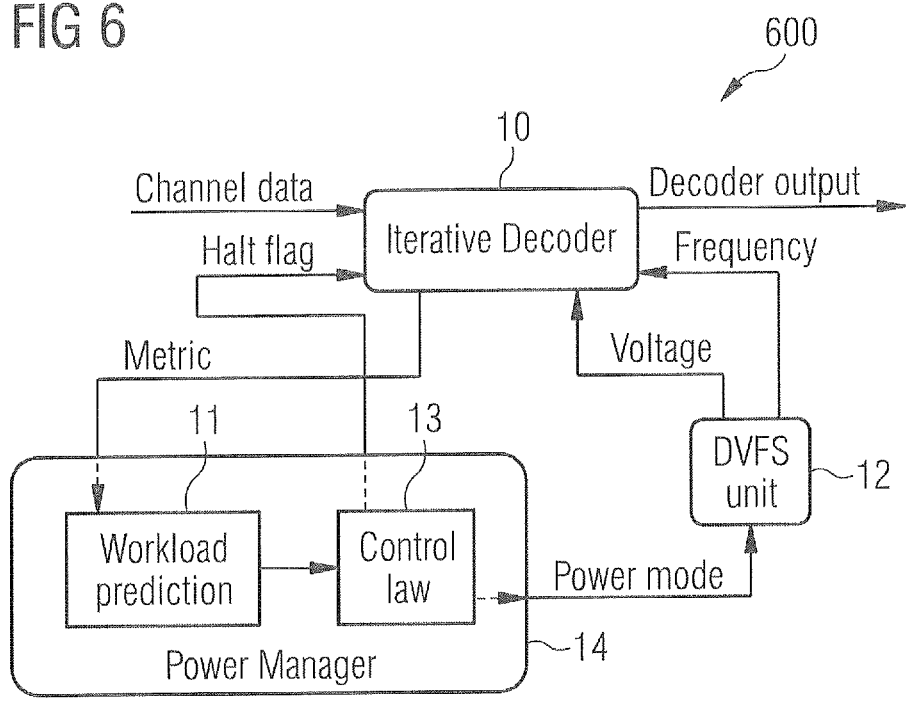
FIG. 6 schematically illustrates a device 600 as a further exemplary embodiment.

FIG. 6 schematically illustrates a device 600 as a further exemplary embodiment. The device 600 includes an iterative decoder 10, for example a turbo decoder, including an input to receive encoded data, for example channel data, and an output to output decoded data as well as a power manager 14. The power manager 14 includes a workload prediction unit 11 to predict a workload required by the decoder 10 to decode a code block received at its input and a unit 13 configured to detect if a decoding has reached a convergence state. In particular, the workload prediction unit 11 may include a first order differentiator configured to provide a workload prediction based on a linear approximation using two decision metric values. Further, the unit 13 may be configured to make a decision in which power mode the decoder 10 will operate during a subsequent iteration, said decision being based on a control law. An example for such a control law becomes apparent from the flow chart of FIG. 9. The decoder 10 is configured to provide values of a decision metric to the workload prediction unit 11. Here, a value of the decision metric may correspond to a number of hard decision changes. However, in other embodiments, a value of the decision metric may be defined in a different way, for example as a number of soft decision changes. The unit 13 is configured to provide a halt (or stop) signal to the decoder 10 in order to terminate a decoding of a code block. For example, the halt signal is transmitted from the unit 13 to the decoder 10 if a stopping criterion is detected.

The device 600 further includes a Dynamic Voltage and Frequency Scaling (DVFS) unit 12 configured to adjust a voltage and a frequency required for the operation of the decoder 10. In FIG. 6, corresponding control signals provided to the decoder 10 are indicated by arrows (see "Voltage", "Frequency"). The power manager 14 and particularly the unit 13 is connected to the DVFS unit 12 to provide a signal including information on which power mode of the decoder 10 is to be chosen by the DVFS unit 12. Note that an adjustment of the voltage and frequency corresponds to an adjustment of the power mode of the decoder 10. In particular, the power mode may be changed by using on-chip switching regulators which may have a reaction time in the order of tens of nanoseconds. A method for operating the device 600 is described in connection with FIG. 9.

FIG. 7 schematically illustrates a method 700 as an exemplary embodiment. The method 700 includes two steps S1, S2 and may, for example, be read in connection with the device 400 of FIG. 4. In a first step S1, a workload required for decoding a code block using a turbo decoder 10 is predicted. Referring back to FIG. 4, the prediction may be performed by the first unit 11. In a second step S2, a power mode of the turbo decoder 10 is selected, the selection depending on the prediction of the workload. Referring back to FIG. 4, the selection may be performed by the second unit 12. Note that the method 700 may also be read in the context of a device in which the turbo decoder 10 is replaced by an arbitrary iterative decoder.

FIG. 8 schematically illustrates a method 800 as a further exemplary embodiment. The method 800 includes five steps S1 to S5 and may, for example, be read in connection with the device 500 shown in FIG. 5. In a first step S1, a code block is decoded using a turbo decoder 10 in a first power mode. In a second step S2, it is detected if the decoding has reached a convergence state (see FIG. 5, third unit 13). In a third step S3, a workload required to decode the code block is predicted (see FIG. 5, first unit 11). In a fourth step S4, a second power mode of the turbo decoder 10 is selected, the selection of the power mode depending on the prediction of the workload. The power of the second power mode is smaller than the power of the first power mode. In the device 500 of FIG. 5, the selection may be performed by the second unit 12. In a fifth step S5, the turbo decoder 10 is operated in the selected power mode.

In the following, an iterative decoder, in particular a turbo decoder, is considered to be a power manageable Complementary Metal Oxide Semiconductor (CMOS) component. The decoder is configured to operate in n power modes which may be defined by a set $$P=\{P_0,P_1,\ldots,P_{n-1}\}. \quad (3)$$

The power of the n power modes may be expressed as $$P_k=P_k^{sw}+P_k^{sc}+P_k^{leak} \quad (4)$$

or $$P_k=E_{sw}C_LV_k^2f_k+I_{SC}V_k+I_{leak}V_k, \quad (5)$$

wherein the variable $P_k^{sw}$ corresponds to a power required for a switching activity. The switching activity may correspond to charging and discharging a load capacitance $C_L$ of the device with a switching factor $E_{sw}$. The variable $P_k^{sc}$ corresponds to a power due to a short-circuit current when an N-type Metal Oxide Semiconductor (NMOS) section and a P-type Metal Oxide Semiconductor (PMOS) section of the device are switched. In addition, the variable $P_k^{leak}$ corresponds to a power due to a leakage current $I_{leak}$, i.e. subthreshold plus reverse bias junction current, which is a technology dependent parameter. The variables $V_k$ and $f_k$ correspond to a voltage and a frequency of the corresponding power mode, respectively.

For example, the power mode $P_0$ may be the power mode in which the decoder consumes the most power while the subsequent power modes, i.e. modes $P_1$, $P_2$, etc., consume each less power than the previous one. Assuming that the decoder is required to perform a number of I iterations to decode a code block before a timing deadline d has been reached, the total energy may be minimized by finding a suitable subset P' of power modes (i.e. P'⊆P) for the decoder to operate. By further assuming that an iteration k is executed in time $t_k$ through a power mode $P_k$, an optimal subset P' of power modes minimizing the total energy may be determined by finding the minimum value $$\text{Min}\left(\sum_k^I P_k t_k\right), \quad (6)$$

wherein $P_k \in P'$. The constraint of the code block being decoded before the timing deadline d has been reached may be expressed as $$\sum_k^I t_k \leq d. \quad (7)$$

Figure 9:
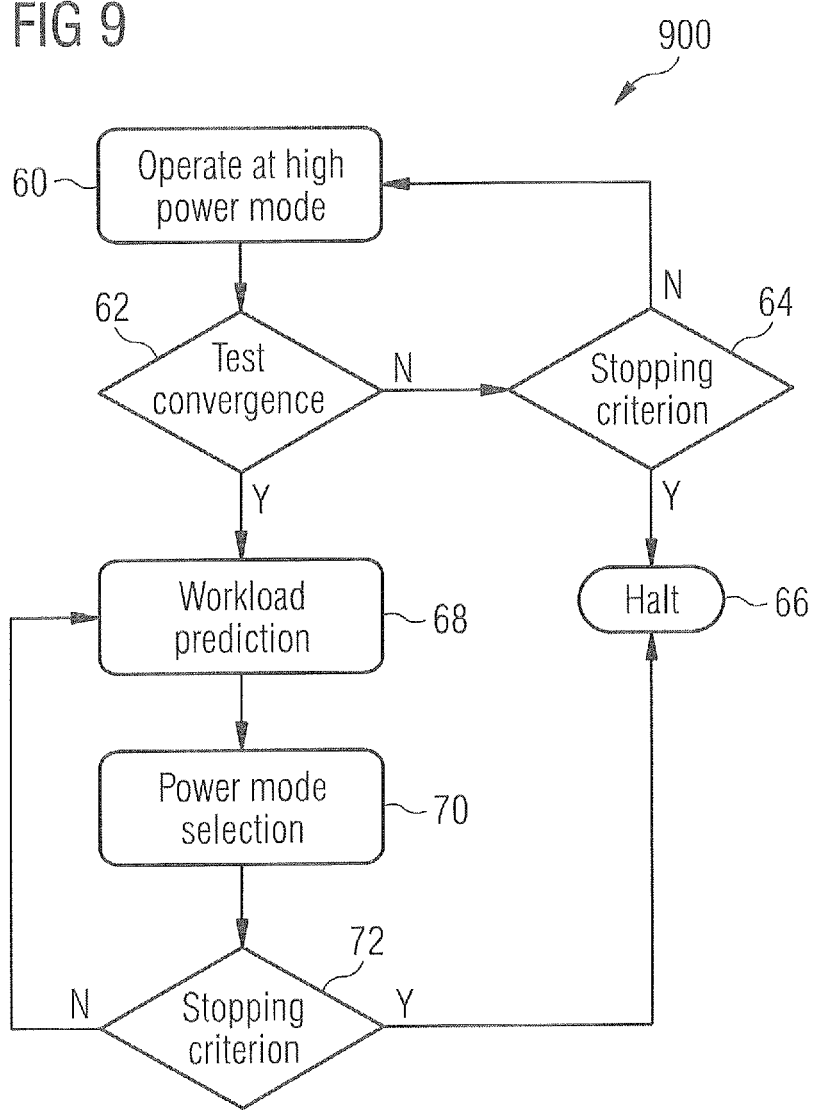
FIG. 9 schematically illustrates a flow chart 900 relating to a method as a further exemplary embodiment.

FIG. 9 schematically illustrates a flow chart 900 representing a method which may be employed to find a suitable subset P' of power modes. The method may be read in connection with the device 600 of FIG. 6. The method may start at a step S1 in which an iterative decoder 10, for example a turbo decoder, operates in a high power mode. Referring to the set P of available power modes (see above), the high power mode may correspond to the power mode $P_0$. In a next step S2, it is tested if a code block that was input to the decoder 10 has reached a convergence state. Referring back to FIG. 6, the convergence test may be performed by the unit 13. For executing said test, the number of hard decisions changes of the decoder 10 may be employed. If the number of hard decisions changes decreases for a predetermined number of consecutive iterations, it may be assumed that the decoding process has entered a convergence state. That is, it is assumed that the number of hard decision changes will further decrease during subsequent iterations, i.e. that the number of hard decision changes shows a decreasing monotonic behavior. For example, the predetermined number of consecutive iterations may be chosen to have a value of two, three, four, etc. Note that the number of hard decision changes may also be referred to as decision metric or convergence metric. Note further that, depending on the type of the used decoder 10, other types of decision metrics may be used during the decoding process.

If no convergence state is detected, the method proceeds with a step S3 in which it is detected if a stopping criterion is fulfilled or not. For example, the stopping criterion is detected if a full convergence of the code block is predicted for the iteration following the current iteration. A full convergence of the code block may be assumed if the number of hard decision changes, i.e. the value of the decision metric, has reached a predetermined value, for example a value of zero. Of course, a full convergence of the code block may be defined differently depending on the type of the employed decoder. If the stopping criterion is detected, the decoding of the code block is terminated in a step S4. Otherwise, the decoder 10 continues the decoding process at the high power mode of step S1.

If a convergence state is detected, the method proceeds with a step S5 in which a workload required by the decoder 10 for decoding the code block is predicted. For example, the workload may be calculated if the number of total iterations required for the decoding is known. The total number of decoding iterations I may be estimated if the two latest values $\epsilon_n$ and $\epsilon_{n+1}$ of the decision metric for the iterations n and n+1 are known:

$$I = n - \frac{\epsilon_n}{\epsilon_{n+1} - \epsilon_n}. \quad (8)$$

Equation (8) corresponds to a linear approximation of the iteration number I and thus the corresponding workload. Said approximation becomes apparent from FIG. 10.

Figure 10:
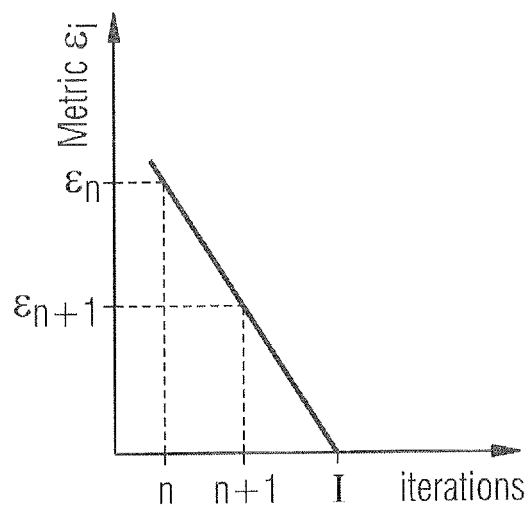
FIG. 10 schematically illustrates an estimation of a workload using a linear approximation.

In FIG. 10, values of a decision metric are plotted against a number of iterations or half iterations. Two decision metric values $\epsilon_n$ and $\epsilon_{n+1}$ for iterations (or half iterations) n and n+1 are known and connected by a solid line. The line crosses the iteration axis at the total number of decoding iterations I.

Referring now back to step S5 of FIG. 9, the workload is firstly predicted for the lowest power mode of a given set P of available power modes of the decoder 10. It is then predicted if the decoder 10, if operated in the lowest power mode, would complete the decoding before a predetermined timing deadline, i.e. if a full convergence of the code block is reached. If a completion of the decoding task is predicted, the lowest power mode is selected in a next step S6. If it is predicted that the decoder 10 will not complete the decoding task before the timing deadline, the workload is predicted for the power mode with the next higher power value. The workload prediction is repeated until a power mode is determined which completes the decoding of the code block before the timing deadline.

In step S6, the power mode determined in step S5 is selected. Referring back to FIG. 6, a signal may be provided by the unit 13 to the DVFS unit 12 such that a voltage and a frequency of the decoder 10 is adjusted to obtain the selected power mode. In a next step S7, it is detected if a stopping criterion is fulfilled. The stopping criterion of step S7 may or may not correspond to the stopping criterion which has already been described in connection with step S3. If the stopping criterion is detected, the decoding task is terminated in step S4. Otherwise, step S5 is performed again. In other words, the loop including the steps S5, S6 and S7 is repeated until the stopping criterion of step S7 is detected. Alternatively, the decoding of the code block may also be terminated if the timing deadline has been reached. Note that the loop and its steps may be repeated in each iteration or each half iteration of the decoding process.

Figure 11:
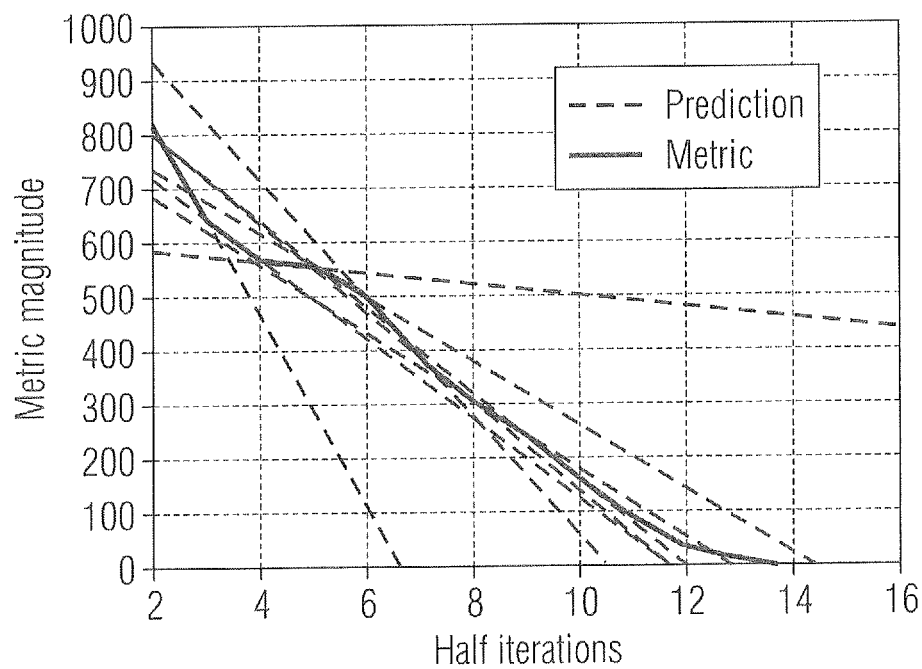
FIG. 11 schematically illustrates a convergence metric.

In FIG. 11, values of a decision metric are plotted against a number of half iterations. In particular, the metric magnitude is illustrated for sixteen half iterations. A solid line corresponds to a selected decision metric while multiple dashed lines illustrate predictions based on linear approximations according to FIG. 10. The illustrated decision metric relates to decoding a code block of length 6144 (bits) by means of a turbo decoder based on the 3GPP-LTE standard. A code rate of ⅔ is used over an AWGN channel using a Quadrature Phase Shift Keying (QPSK) modulation at an energy per bit to noise power spectral density ratio, i.e. a Signal to Noise Ratio (SNR) per bit, of $$\frac{E_b}{N_0} = 1 \text{ dB}.$$

The generation of the selected metric, i.e. the solid line of FIG. 11, is explained in the following.

At the start of the decoding process, the decoder operates in a first power mode, for example the highest power mode available. In FIG. 11, this power mode is used until the third half iteration, wherein the value of the decision metric decreases from a value of about 815 to a value of about 630. At the third half iteration, a workload is predicted as it has already been described in connection with step S5 of FIG. 9. If a suitable power mode has been determined, the next half iteration in FIG. 11 is performed with the decoder operating in a power mode selected on the basis of the predicted workload. During this next half iteration step, the decision metric decreases further as can be seen from the solid line between the third and fourth iteration. The decoding process is continued until a full convergence of the code block has been established, i.e. until the value of the decision metric reaches a value of zero. Note that each dashed line in FIG. 11 is generated by a linear approximation performed in the context of a workload prediction. The employed linear approximation may correspond to the approximation of FIG. 10. That is, each dashed line in FIG. 11 may be identified with the solid line of FIG. 10.

Figure 12A:
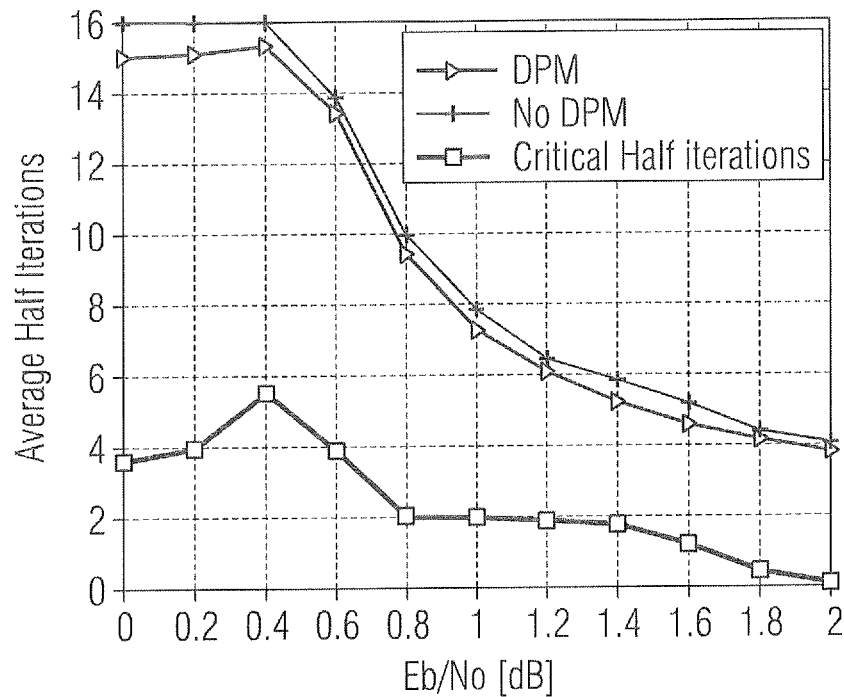
FIGS. 12A and 12B schematically illustrate average half iterations and critical iterations plotted against the energy per bit to noise power spectral density ratio.
Figure 12B:
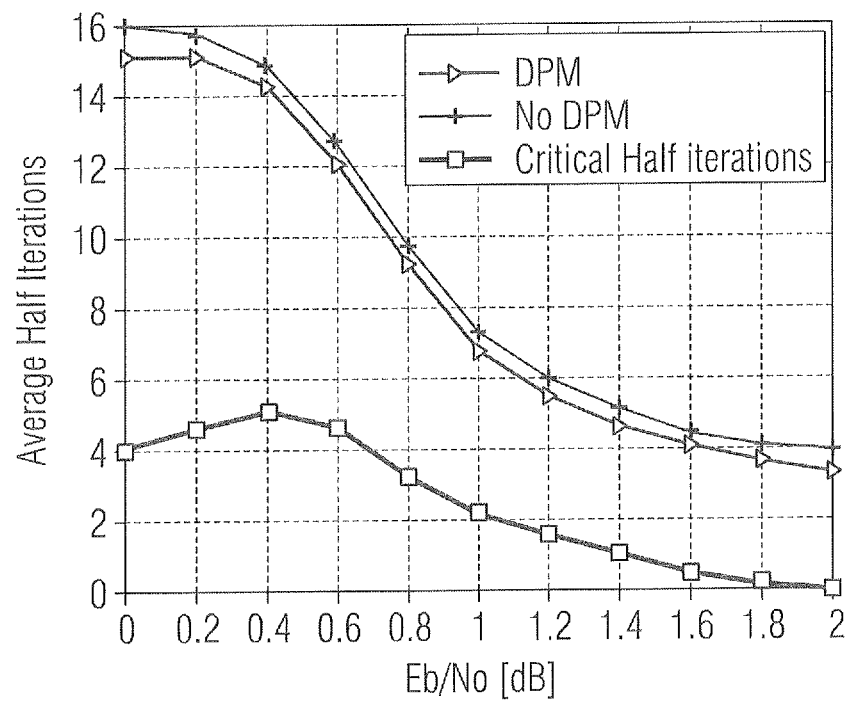

In FIGS. 12A and 12B, an average number of half iterations is plotted against the SNR per bit for the case of turbo decoding a code block using a method as it has, for example, been described in connection with FIGS. 7, 8, 9 and decoding a code block using a Hard Decision Aided (HDA) criterion. Here, FIGS. 12A and 12B relate to decoding a code block of length 6144 and 1280, respectively. Further, the simulation scenario corresponds to the one that has already been described in connection with FIG. 11.

In the following, the methods of FIGS. 7, 8 and 9 may also be referred to as Dynamic Power Management (DPM). In FIGS. 12A and 12B, the graphs relating to the average number of half iterations are thus labeled as "DPM" and "No DPM". In addition, the number of critical iterations is plotted against the SNR per bit (see "Critical Half Iterations"), wherein the number of critical iterations may be defined as the number of half iterations required for the decoding task to enter a convergence state. In FIGS. 12A and 12B, a convergence state is supposed to be entered if three consecutive decreasing samples of the decision metric are detected.

Figure 13A:
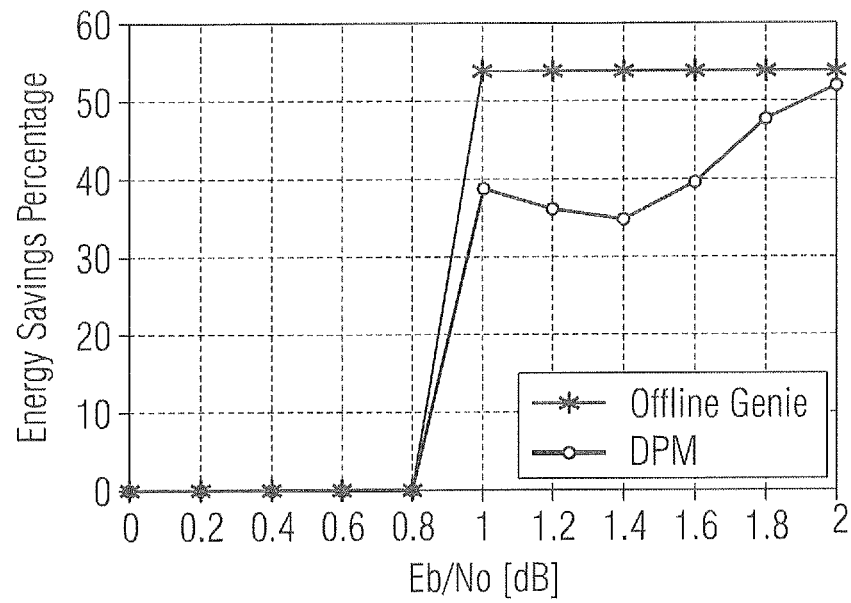
FIGS. 13A and 13B schematically illustrate average energy savings plotted against the energy per bit to noise power spectral density ratio.
Figure 13B:
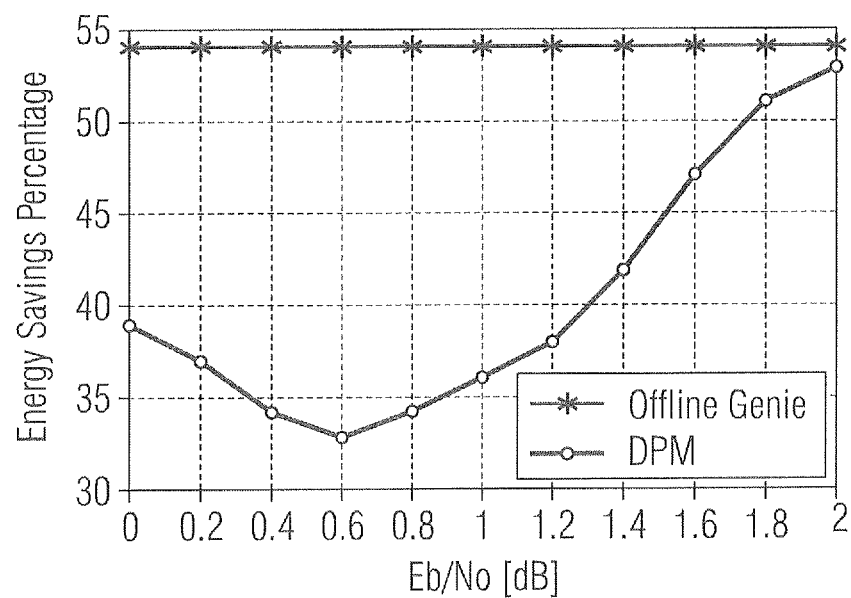

In FIGS. 13A and 13B, percentage values of energy savings are plotted against the SNR per bit for the case of turbo decoding a code block using a DPM method as it has, for example, been described in connection with FIGS. 7, 8 and 9 (see "DPM"). Here, a turbo decoder configured to operate in a high power mode (V=1.2 V, f=266 MHz) and a low power mode (V=0.9 V, f=160 MHz) is assumed. In addition, energy savings are illustrated for the case of an offline power management policy (see "Offline Genie"), i.e. a technique in which the decoding effort, that is the required total number of half iterations, is known in advance such that it is possible to select an appropriate power mode of the decoder from the very start of a decoding task. Note that the offline power management policy represents an upper bound of the DPM method. Usually an offline power management policy cannot be realized, since the required information for predicting the total number of half iterations is not known at the start of a decoding task. The energy savings percentage values in FIGS. 13A and 13B are with respect to the total energy values of a turbo decoder merely operating in the high power mode.

FIGS. 13A and 13B relate to decoding a code block of length 6144 and 1280, respectively. For the case of a code block of length 6144, the required decoding effort at low values for the SNR per bit is high. The offline policy as well as the online policy provide results starting at a value of 0.8 dB for the SNR per bit. For the case of a code block of length 1280, the decoding effort is less and both techniques deliver energy savings at low SNR per bit values. In both cases, at high SNR per bit values, there are more possibilities for energy savings, because the decoding effort decreases and hence there is a longer slack (see FIG. 3) for switching to lower power modes. Note that the energy savings are a function of the power modes characteristics and depend on the available technology.

Figure 14A:
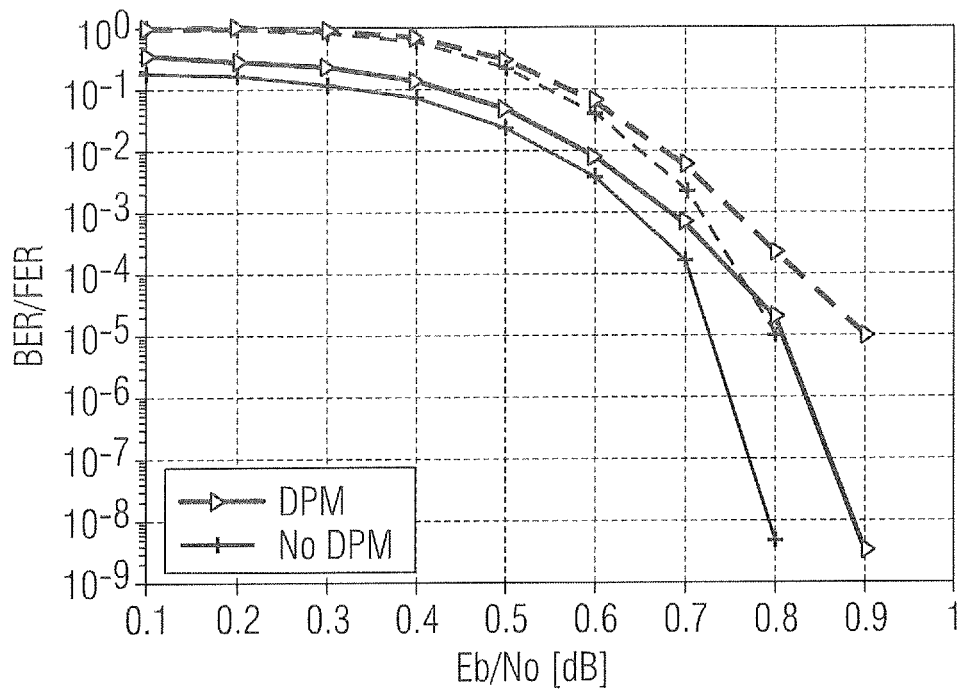
FIGS. 14A and 14B schematically illustrate error correction performances plotted against the energy per bit to noise power spectral density ratio.
Figure 14B:
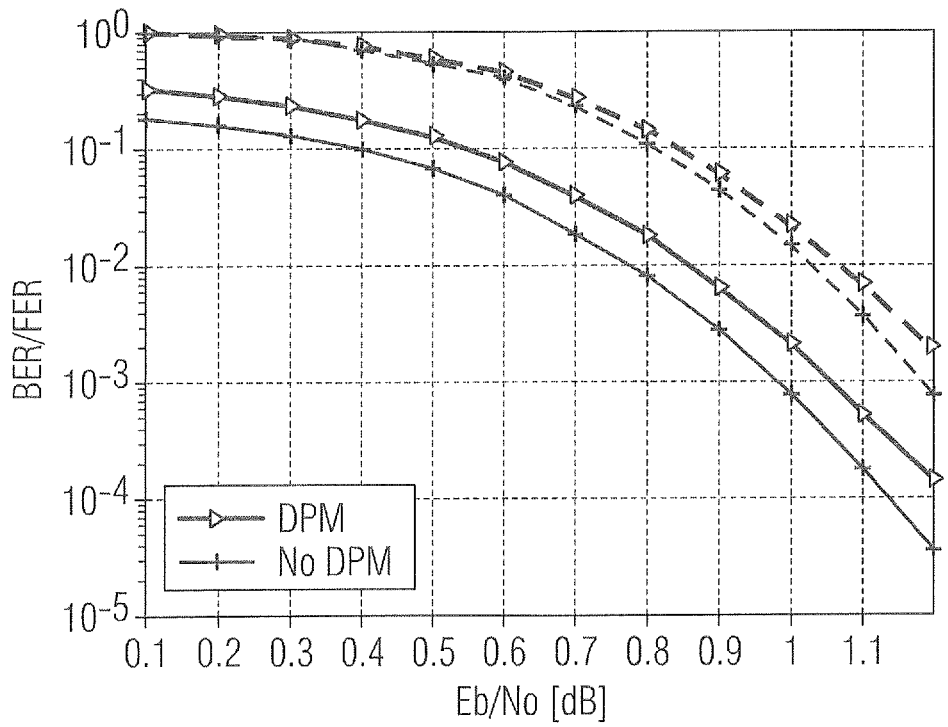

As it has already been described in connection with the flow chart of FIG. 9, a stopping criterion may be applied to terminate a decoding task. A stopping criterion may be satisfied erroneously if a convergence is detected even if a convergence does in fact not exist. Such a wrong decision may be referred to as false alarm and may result in a loss in error correction performance. In FIGS. 14A and 14B, the Bit Error Rate (BER) and the Frame Error Rate (FER) are plotted against the SNR per bit for the case of turbo decoding a code block using a DPM method (see "DPM") and decoding a code block using an HDA criterion (see "No DPM"). FIGS. 14A and 14B relate to decoding a code block of length 6144 and 1280, respectively. As can be seen from FIGS. 13A and 13B, energy savings up to 54% may be obtained. In addition, FIGS. 14A and 14B show that by exploiting the predictions on the decoding and using a DPM method, the energy efficiency of the system can be improved with only a small impact on error correction performance.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application.

What is claimed is:

1. A method, comprising:
predicting a workload required for decoding a code block using a turbo decoder; and
selecting a power mode of the turbo decoder from at least a first power mode of the turbo decoder and a second power mode of the turbo decoder, the selection of the power mode depending on the prediction of the workload,
wherein the first power mode of the turbo decoder determines a first energy required for completing a number of decoding iterations performed by the turbo decoder and the second power mode of the turbo decoder determines a second energy required for completing the same number of decoding iterations performed by the turbo decoder, wherein the first energy differs from the second energy.

2. The method of claim 1, further comprising:
detecting if the decoding has reached a convergence state.

3. The method of claim 2, wherein predicting the workload is performed if the convergence state is detected.

4. The method of claim 3, wherein the decoding is an iterative decoding and predicting the workload is performed during each iteration or half iteration of the decoding.

5. The method of claim 2, wherein the decoding is an iterative decoding and the convergence state is detected if a value of a decision metric decreases for at least a predetermined number of consecutive iterations of the decoding.

6. The method of claim 1, wherein predicting the workload is based on a linear approximation.

7. The method of claim 6, wherein the linear approximation depends on two values of a decision metric.

8. The method of claim 1, further comprising:
stopping the decoding if a stopping criterion is detected.

9. The method of claim 8, wherein the decoding is an iterative decoding and the stopping criterion is detected during an iteration or a half iteration if a full convergence of the code block is predicted for the subsequent iteration or half iteration.

10. The method of claim 8, wherein the decoding is an iterative decoding and the stopping criterion is detected if a value of a decision metric has reached a predetermined value.

11. The method of claim 10, wherein a value of the decision metric corresponds to a number of hard decision changes.

12. The method of claim 1, further comprising:
operating the turbo decoder in a first power mode before a convergence state of the decoding has been detected, wherein the power of the first power mode is greater than the power of the selected power mode; and
operating the turbo decoder in the selected power mode.

13. The method of claim 1, wherein the power mode is selected such that the code block fully converges before a predetermined time.

14. The method of claim 1,
wherein predicting the workload required for decoding the code block is performed for each of a plurality of different power modes of the turbo decoder,
wherein the workload comprises an energy required to perform the decoding of the code block, and
wherein selecting the power mode of the turbo decoder from the plurality of different power modes is based on the prediction of the workloads.

15. A device, comprising:
a turbo decoder;
a first unit configured to predict a workload required for decoding a code block using the turbo decoder; and
a second unit configured to select a power mode of the turbo decoder from at least a first power mode of the turbo decoder and a second power mode of the turbo decoder, the selection of the power mode depending on the prediction of the workload,
wherein the first power mode of the turbo decoder determines a first energy required for completing a number of decoding iterations performed by the turbo decoder and the second power mode of the turbo decoder determines a second energy required for completing the same number of decoding iterations performed by the turbo decoder, wherein the first energy differs from the second energy.

16. The device of claim 15, wherein the turbo decoder is configured to operate on the basis of an adjustable voltage and an adjustable frequency.

17. The device of claim 15, further comprising:
a third unit configured to detect if the decoding has reached a convergence state.

18. The device of claim 17, wherein the first unit predicts the workload if the convergence state is detected.

19. The device of claim 18, wherein the turbo decoder is an iterative decoder and the first unit predicts the workload during each iteration or half iteration of the decoding.

20. The device of claim 17, wherein the turbo decoder is an iterative decoder and the convergence state is detected if a value of a decision metric decreases for at least a predetermined number of consecutive iterations or half iterations of the decoding.

21. The device of claim 15, wherein the first unit is configured to predict the workload on the basis of a linear approximation, the linear approximation depending on two values of a decision metric.

22. The device of claim 15, wherein a full convergence of the code block is detected if a value of a decision metric has reached a predetermined value.

23. The device of claim 22, wherein a value of the decision metric corresponds to a number of hard decision changes.

24. The device of claim 15,
wherein the first unit is configured to predict the workload required for decoding the code block for each of a plurality of different power modes of the turbo decoder,
wherein the workload comprises an energy required to perform the decoding of the code block, and
wherein the second unit is configured to select the power mode of the turbo decoder from the plurality of different power modes based on the prediction of the workloads.

25. A method, comprising:
decoding a code block using a turbo decoder in a first power mode;
detecting if the decoding has reached a convergence state;
predicting a workload required to decode the code block;
selecting a second power mode of the turbo decoder, the selection of the second power mode depending on the prediction of the workload, wherein the power of the second power mode is smaller than the power of the first power mode; and
operating the turbo decoder in the second power mode,
wherein the first power mode of the turbo decoder determines a first energy required for completing a number of decoding iterations performed by the turbo decoder and the second power mode of the turbo decoder determines a second energy required for completing the same number of decoding iterations performed by the turbo decoder, wherein the first energy differs from the second energy.

26. The method of claim 25,
wherein predicting the workload required to decode the code block is performed for the first power mode and the second power mode,
wherein the workload comprises an energy required to perform the decoding of the code block, and
wherein selecting the second power mode is performed if the predicted workload of the second power mode is less than the predicted workload of the first power mode.

27. A device, comprising:
a turbo decoder configured to operate in one of a first power mode and a second power mode;
a first unit configured to predict a workload required for decoding a code block using the turbo decoder;
a second unit configured to select a power mode of the turbo decoder from at least a first power mode of the turbo decoder and a second power mode of the turbo decoder, the selection of the power mode depending on the prediction of the workload, wherein the first power mode of the turbo decoder determines a first energy required for completing a number of decoding iterations performed by the turbo decoder and the second power mode of the turbo decoder determines a second energy required for completing the same number of decoding iterations performed by the turbo decoder, wherein the first energy differs from the second energy; and a third unit configured to detect if the decoding has reached a convergence state.

28. The device of claim 27, wherein the first unit is configured to predict the workload for decoding the code block using the turbo decoder in each of a plurality of different power modes, wherein the workload comprises an energy required to perform the decoding of the code block, and wherein the second unit is configured to select one of the plurality of different power modes based on the predicted workload.

29. A method, comprising:

predicting a workload required for decoding a code block using an iterative decoder; and selecting a power mode of the iterative decoder from at least a first power mode of the turbo decoder and a second power mode of the turbo decoder, the selection of the power mode depending on the prediction of the workload, wherein the first power mode of the turbo decoder determines a first energy required for completing a number of decoding iterations performed by the turbo decoder and the second power mode of the turbo decoder determines a second energy required for completing the same number of decoding iterations performed by the turbo decoder, wherein the first energy differs from the second energy.

30. The method of claim 29, wherein predicting the workload required for decoding a code block using an iterative decoder is performed for each of a plurality of different power modes, wherein the workload comprises an energy required to perform the decoding of the code block, and wherein selecting the power mode of the iterative decoder is based on the prediction of the workloads.

* * * * *